United States Patent Office 3,345,131
Patented Oct. 3, 1967

3,345,131
METHODS OF PREVENTING DECOMPOSITION OF ANHYDROUS AMMONIUM THIOSULFATE
Harold E. Ingraham, East Stroudsburg, Pa., assignor to Heico, Inc., a corporation of Delaware
No Drawing. Filed May 5, 1964, Ser. No. 365,172
8 Claims. (Cl. 23—115)

This application in a continuation-in-part of my co-pending application Ser. No. 348,778, filed Mar. 2, 1964, and now abandoned.

This invention relates to a process of preventing the decomposition of anhydrous ammonium thiosulfate. It relates more particularly to a method of preventing the decomposition of anhydrous ammonium thiosulfate by compressing the freshly prepared crystals of anhydrous ammonium thiosulfate into briquettes.

Ammonium thiosulfate is shipped and stored, at the present time, almost exclusively in the form of a water solution. This solution as customarily manufactured contains from 57 percent to 60 percent by weight of anhydrous ammonium thiosulfate, $(NH_4)_2S_2O_3$. It is necessary to ship and store ammonium thiosulfate in water solution because anhydrous ammonium thiosulfate decomposes spontaneously, yielding decomposition products, the most objectionable of which is elemental sulfur. These decomposition products do not dissolve completely, so that anhydrous ammonium thiosulfate in which decomposition has taken place yields a murky solution which is unusable in the arts. A considerable saving in shipping and storage costs could be effected if the decomposition of anhydrous ammonium thiosulfate could be prevented. That these savings would be economically important is indicated by the fact that the annual consumption of ammonium thiosulfate in the United States is on the order of 10,000 tons. In addition, where storage space and weight is at a premium, as in military, air or naval installations, the use of anhydrous ammonium thiosulfate is obviously advantageous.

I have found that the decomposition of anhydrous ammonium thiosulfate can be prevented by compressing the freshly prepared crystals of anhydrous ammonium thiosulfate into briquets of any size convenient to the user. Preferably, I compress the crystals while they are still somewhat moist with mother liquor. Preferably, the mother liquor is somewhat ammoniacal, with a pH approximately 9. I may, however, compress the dry crystals of anhydrous ammonium thiosulfate, free of adhering mother liquor, if decomposition of the anhydrous ammonium thiosulfate has not yet begun.

While not wishing to be bound by any specific theory as to the mechanism by which compressing ammonium thiosulfate into briquettes prevents the decomposition of ammonium thiosulfate, it seems probably that the decomposition reaction begins with the dissociation of ammonium thiosulfate as follows:

$$(NH_4)_2S_2O_3 \rightarrow NH_3 + NH_4HS_2O_3 \quad (1)$$

The ammonia formed by this reaction, being a gas at ordinary temperatures, escapes, leaving behind the ammonium hydrogen thiosulfate. The ammonium hydrogen thiosulfate, in turn, decomposes as follows:

$$NH_4HS_2O_3 \rightarrow NH_4HSO_3 + S \quad (2)$$

The sulfur formed in the above reaction gives a yellow discoloration to the ammonium thiosulfate remaining. Furthermore, when the ammonium thiosulfate is now dissolved in water, it no longer gives a clear, colorless solution, but gives a murky solution due to the insolubility of the particles of sulfur.

The mechanism of the decomposition reaction is complicated, and may follow other lines than those indicated, but the sulfur which results makes the ammonium thiosulfate unacceptable in the trade and useless in the arts.

The compression of ammonium thiosulfate into briquettes prevents the decomposition of ammonium thiosulfate, probably by decreasing the surface area available for escape of gaseous ammonia. For example, if one million crystals of ammonium thiosulfate, all of an approximately equal sifie, are all compressed into one solid block, the surface area available has been decreased by a factor of approximately one million times. Furthermore, if by chance some ammonia did dissociate in the interior of the block, it would be held trapped by the unyielding mass of the block. This inability of the ammonia to depart from the site of decomposition inhibits any further tendency of the ammonium thiosulfate to decompose.

In order to accomplish the foregoing purposes I have found that enough pressure must be applied so that the crystals of ammonium thiosulfate coalesce into a hard, compact pellet or briquette. Depending upon the degree of compaction desired, pressures up to 100,000 pounds per square inch, or greater may be applied. I have found, however, that pressures in the range of 5,000 pounds per square inch to 20,000 pounds per square inch are most desirable, although greater or lesser pressures (e.g., about 500 to 100,000 pounds per square inch) may be used under various circumstances as desired. The small amount of mother liquor adhering to the crystals appears to facilitate the compacting process by promoting the compacting or cementing of the particles together.

The following examples are given by way of description to indicate the manner in which the invention can be carried out:

Example I

About 35 grams of ammonium thiosulfate, still moist from the centrifuge, was placed in a die and a pressure of 10,000 pounds per square inch was applied. The crystals of ammonium thiosulfate coalesce under this pressure into a hard, compact briquette. The small amount of mother liquor adhering to the crystals appears to facilitate the compacting process by acting as a cement. The resulting briquettes showed no significant deterioration after 6 months storage whereas the parent granular ammonium thiosulfate showed the yellow discoloration of decomposition at the end of the same time.

Example II

Fifty pounds of ammonium thiosulfate, still moist from the centrifuge were placed in a die and a pressure of 20,000 pounds per square inch was applied and maintained until the thiosulfate coalesced into a hard compact briquette. This briquette showed no significant deterioration after 6 months of storage.

Example III

Ten pounds of ammonium thiosulfate, dried, was placed in a die and a pressure of 20,000 pounds per square inch was applied until the thiosulfate was compacted. The resulting briquette showed no significant storage deterioration after 6 months.

The degree of compaction required in order to achieve satisfactory briquettes varies somewhat, but in general the volume of a satisfactory briquette is from 50% to 65% of the volume of the crystalline ammonium thiosulfate before compaction.

The briquettes formed by the above process are substantially stable over an indefinitely long period of time.

Since many changes could be made in the above methods and products without departing from the scope of the invention, it is intended that all matter contained

I claim:

1. The method of preserving anhydrous ammonium thiosulfate against decomposition which comprises compressing it into briquettes whose volume is less than 65% of the original uncompressed material.

2. The method of preserving anhydrous ammonium thiosulfate against decomposition which comprises compressing the ammonium thiosulfate under a pressure of about 5,000 to 20,000 pounds per square inch.

3. The method of preserving anhydrous ammonium thiosulfate against decomposition which comprises reducing the surface area available for escape of ammonia vapor by compressing, under a pressure of about 10,000 to 20,000 pounds per square inch.

4. An article of manufacture comprising briquettes of ammonium thiosulfate formed under pressure substantially free from decomposition products of ammonium thiosulfate to a volume less than 65% of the original uncompressed material.

5. An article of manufacture comprising ammonium thiosulfate in a form having a reduced surface area available for escape of ammonia vapor by forming under a pressure of about 10,000 to 20,000 pounds per square inch.

6. An article of manufacture comprising a briquette of ammonium thiosulfate formed under pressure of about 5,000 to 20,000 pounds per square inch.

7. The method of preserving anhydrous ammonium thiosulfate against decomposition which comprises compressing the ammonium thiosulfate under a pressure of about 500 to 100,000 pounds per square inch.

8. An article of manufacture comprising a briquette of ammonium thiosulfate formed under pressure of about 500 to 100,000 pounds per square inch.

No references cited.

EARL C. THOMAS, *Primary Examiner.*